Feb. 27, 1940.　　　　F. J. BUFFA　　　　2,191,954
BRAKE
Filed May 4, 1939　　　　2 Sheets-Sheet 1

F. J. Buffa
INVENTOR.

BY CASnowles.

ATTORNEYS.

Feb. 27, 1940.　　　　F. J. BUFFA　　　　2,191,954
BRAKE
Filed May 4, 1939　　　　2 Sheets-Sheet 2
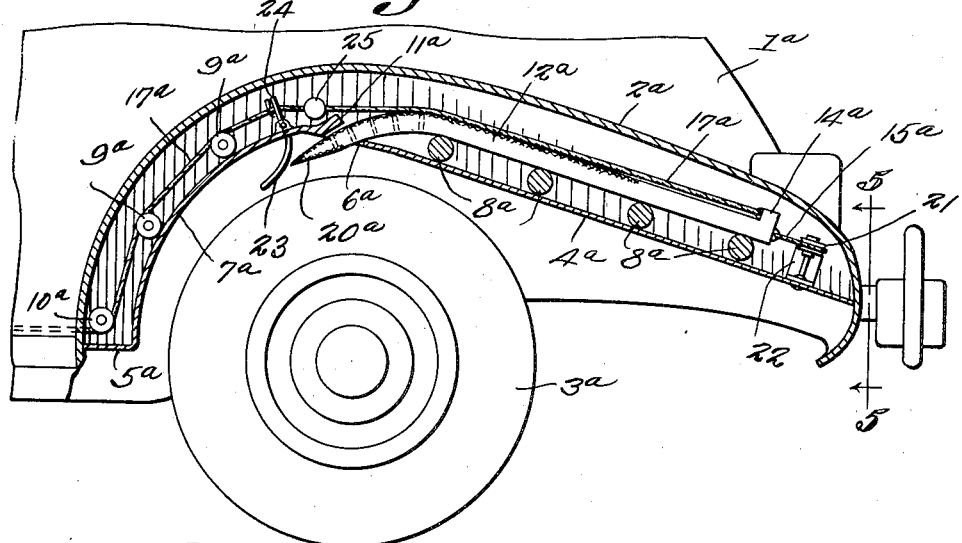
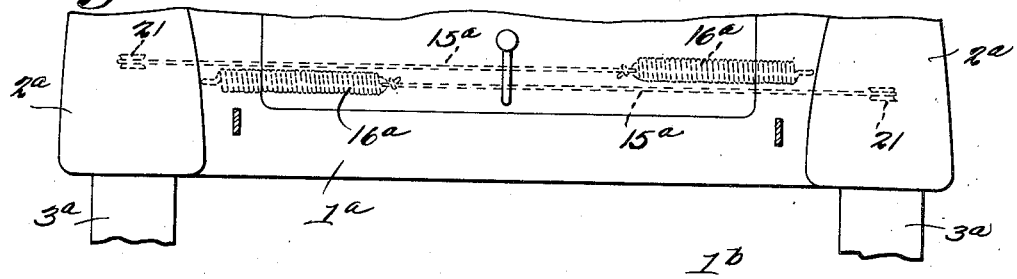
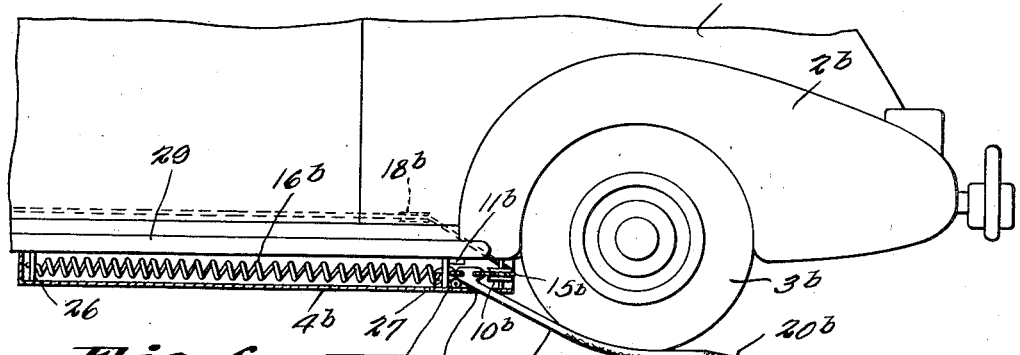
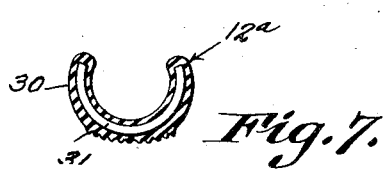
INVENTOR.
F. J. Buffa
BY
ATTORNEYS.

Patented Feb. 27, 1940

2,191,954

UNITED STATES PATENT OFFICE 2,191,954

BRAKE

Ferdinand J. Buffa, Brooklyn, N. Y.

Application May 4, 1939, Serial No. 271,787

4 Claims. (Cl. 188—4)

This invention aims to provide novel means for mounting, operating and controlling a flexible mat, adapted to be interposed between the rear wheels of a vehicle and the ground, regardless of the construction of the mat and the means for mounting, operating and controlling it, to check the progress of the vehicle, and to prevent skidding of the vehicle on wet and ice-covered roadways.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:

Fig. 4 is an elevation showing a modified form of the invention, parts being in section;

Fig. 5 is a transverse section on the line 5—5 of Fig. 4;

Fig. 6 is an elevation showing a further modification, parts being in section.

Fig. 7 is a transverse section showing the mat employed in connection with the form depicted in Fig. 4.

Figure 1:
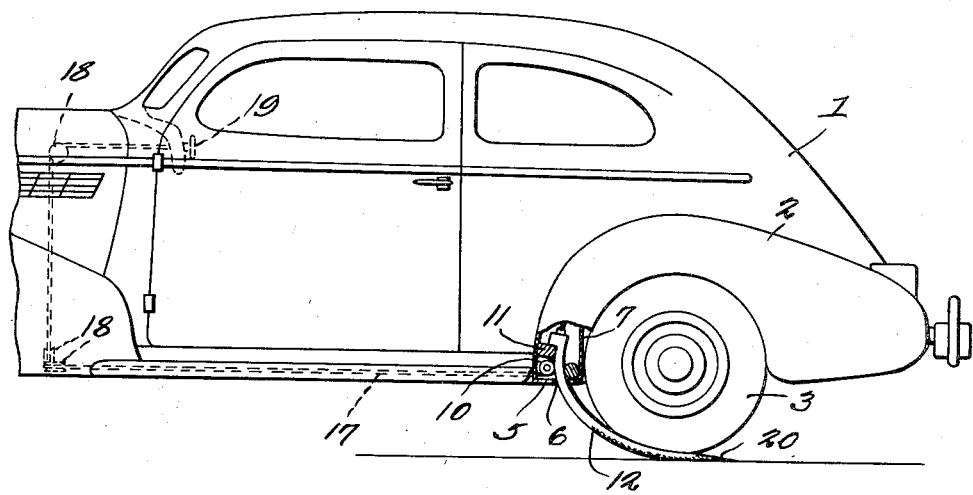
Fig. 1 shows in side elevation, a portion of a car equipped with the device forming the subject matter of this application, the mat being in working position.
Figure 2:
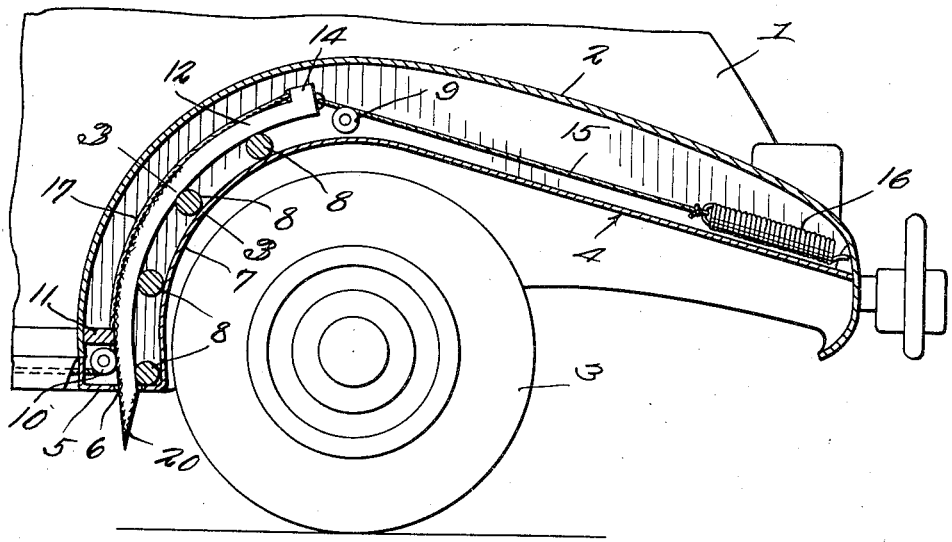
Fig. 2 is an elevation on an enlarged scale, parts being sectioned, to show the mat retracted.
Figure 3:
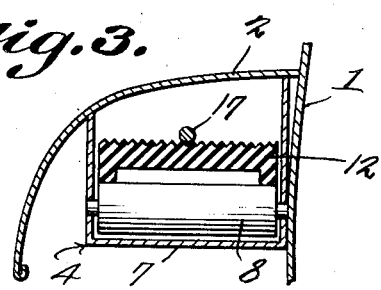
Fig. 3 is a cross section on the line 3—3 of Fig. 2.

Referring to Figs. 1, 2 and 3, the numeral 1 marks a car body to which is attached a fender 2, the ground wheel 3 of the car being located below the fender.

A trough-shaped casing 4 is secured to the fender 2, within the fender. The casing 4 has a horizontal front wall 5 constituting a guide at the front end of the fender 2. There is a hole 6 in the wall 5.

Distributed along the curved part 7 of the bottom of the casing 4 are transverse rollers 8 which are journaled in the side walls of the casing 4. Behind the rearmost roller 8 is located a sheave 9, supported for rotation on the side walls of the casing 4. An idler 10 is supported for rotation in the side walls of the casing 4 and is located at the lower or front end of the fender 2, closely adjacent to the lowermost roller 8. A rigid stop 11 is secured to the side wall of the fender 2 and is located a little above the idler 10.

A flexible mat 12 is provided and may be made of any desired material or combination of materials. For example, the mat 12 may be made of rubber or a rubber compound, reinforced with metal but not to such an extent as to impair the flexibility of the mat. The mat 12 rides on the rollers 8 and is provided at its rear end with a projecting shoulder 14. The forward end of a flexible element 15 is made fast to the rear end of the mat 12, the rear end of the flexible element being secured to the forward end of a pull spring 16, having its rear end attached to the back end of the fender 2 and to the bottom of the casing 4. In order that the ground wheel 3 may ride on the mat 12, without a bump or jar, the free end of the mat is tapered as shown at 20. The mat 12 extends down a little way through the hole 6 in the guide 5, when the convolutions of the pull spring 16 are closed together, and, thus, the mat is always in position to be lowered until it can be gripped between the ground wheel 3 and the soil.

A flexible element 17 is made fast to the shoulder 14 of the mat 12. The flexible element 17 is rove over the idler 10, and the flexible element extends down along the mat 12 to aid in holding it on the rollers 8. Idlers 18 are located wherever desired, on the car, so that the flexible element 17 can be run forward, upward and backward, to a handle 19 located accessibly adjacent to the driver's seat.

Although but one fender 2 has been referred to, the structure discussed can be duplicated to any desired extent.

The operator lays hold of the handle 19 and pulls on the flexible element 17, the spring 16 being stretched, the flexible element 15 running over the sheave 9, and the mat 12 being lowered until it is caught between the wheel 3 and the ground, whereupon the mat, located as shown in Fig. 1, will tend to check the advance of the car. The shoulder 14 on the mat 12 engages the stop 11 to keep the mat in the position of Fig. 1, much strain, therefore, being taken off the spring 16 and the flexible element 15.

To restore the parts to the position of Fig. 2, the car is set aback, until the wheel 3 is off the mat 12, and then the mat will be restored to the position of Fig. 2, by the pull of the spring 16. Because many working parts are enclosed within the casing 4, they will not be fouled by mud cast up by the wheel 3.

In Fig. 4, parts hereinbefore described have been designated by numerals already used, with the suffix "a."

The sheaves 9a are in advance of the rollers 8a, instead of behind them, as suggested in Fig. 2. The hole 6a is not in the end wall 5a of the casing 4a but in the bottom of the casing, above the wheel 3a. The stop 11a has a rearward and upward inclination, so that it is adapted not only to be engaged by the shoulder 14a, but also to guide the mat 12a down on the periphery of the wheel 3a. The flexible elements 15a are run over idlers 21 on brackets 22 carried by the bottom of the casing 4a, near the rear end of the casing. Figure 5 shows that the flexible elements 15a run crosswise of the car, in opposite directions, and are connected to the inner ends of the pull springs 16a, the outer ends of the pull springs being anchored on the car body.

A curved mat holder 23 is pivotally mounted intermediate its ends on the bottom of the casing 4a, immediately in front of the tapered end 20a of the mat 12a. The mat holder 23 has a fork 24 at its upper end, located within the casing 4a. The flexible element 17a pays through the fork 24. There is a projection 25 on the flexible element 17a. The projection 25 is located behind the fork 24. The projection 25 comes into contact with the fork 24 and tilts the mat holder 23 so that its curved end presses the mat 12a against the periphery of the wheel 3a, so that the mat will be fed down by the rotation of the wheel.

So far as the function of the mat 12a is concerned considered relatively to the wheel 3a on the ground, the structure of Fig. 4 has no characteristic peculiarities that need description. The mat 12a is advanced by the flexible element 17a under the pull of such a part as the handle 19 of Fig. 1.

The mat 12a used in the embodiment of the invention disclosed in Fig. 4 is of pronouncedly trough-shape. It comprises a body 30, made of rubber or a rubber compound, and any desired number of U-shaped metal springs 31 are incorporated in the body. The purpose of the springs 31 is to cause the mat 12a to grip and fit snugly upon the tire 3a, when the mat holder 23 presses the mat downwardly upon the tire.

The stop 25 will only permit movement of the cable 17a to the position in which the stop 25 engages the member 24. The shoe 12a must thereafter be moved to braking position solely by the dragging action of the tire. The cable 17a will therefore slacken and buckle in the casing 2a—4a to permit this action.

In Fig. 6, parts hereinbefore described have been designated by numerals already used, with the suffix "b."

The casing 4b is straight and is secured underneath the running board 29. The pull spring 16b is attached at its forward end to a plate 26 secured in the casing 4b. The back end of the pull spring 16b is connected to a slide 27 mounted to reciprocate in the casing 4b. The slide 27 is pivoted to the forward end of the mat 12b.

The form shown in Fig. 6 will be understood, as to operation, in view of what has been stated hereinbefore, in connection with the form shown in Fig. 2.

In any of its forms, the device is simple in construction, but it affords an efficient means whereby a flexible mat may be lowered until it is caught between the wheel or an auto and the highway, a braking effect being produced, which is well understood by those skilled in the art.

Although the device is shown as being hand-operated, it can be power-operated, without departing from the spirit of the invention.

Having thus described the invention, what is claimed is:

1. In a brake of the class described, a vehicle-carried support having an opening in its bottom, a mat slidable through the opening, a flexible element connected to the mat and constituting means under the control of an operator for advancing the mat with respect to a wheel of the vehicle, a movable holder on the support and engageable with the mat to press it against the vehicle wheel, and means on the flexible element for moving the holder into mat-pressing position when the flexible element is actuated to advance the mat.

2. In a brake of the class described, a vehicle-carried support, having an opening in its bottom, a mat slidable through the opening, a flexible element connected to the mat and constituting means under the control of an operator for advancing the mat with respect to a wheel of the vehicle, a movably mounted holder fulcrumed intermediate its ends on the support and engageable at one end with the mat to press it against the vehicle wheel, and a projection on the flexible element and engageable with the opposite end of the holder to move the first-specified end of the holder into mat-pressing position when the flexible element is actuated to advance the mat.

3. In a brake of the class described, a casing, means for securing the casing to a vehicle, the casing having a curved forward portion conforming approximately to a wheel of the vehicle, rollers secured to the curved forward portion of the casing, a pull spring having its rear end connected to the rear part of the casing, means for connecting the forward end of the pull spring to the mat, the casing having an opening located in advance of the wheel, and means for moving the mat downwardly through the opening, and a stop in the curved portion of the casing, the stop serving to hold the mat in position with respect to one of the rollers, adjacent to the opening, and the mat having a projection engageable with the stop, to limit positively the downward and rearward movement of the mat, when the mat is engaged between the wheel and the ground.

4. In a brake of the class described, a fender having an opening in its lower portion, transverse rollers journaled in the fender, a flexible mat mounted to move over the rollers, means for advancing the mat through the opening, at the will of an operator, said means comprising a flexible element secured at its rear end to the rear end of the mat, and extended lengthwise of the mat, on top of the mat, and above the rollers, to hold the mat engaged with the rollers, and spring means for retracting the mat.

FERDINAND J. BUFFA.